United States Patent
Kaster et al.

(10) Patent No.: US 7,961,449 B2
(45) Date of Patent: Jun. 14, 2011

(54) EXTENDED CONTROLLER KEEP ALIVE SYSTEM AND METHOD

(75) Inventors: Robert Kaster, White Lake, MI (US); Gareth Selfe, Detroit, MI (US); John Hobbs, Brighton, MI (US); Richard Breitzman, Highland, MI (US)

(73) Assignee: Robert Bosch GmbH, Stuttgart (DE)

( * ) Notice: Subject to any disclaimer, the term of this patent is extended or adjusted under 35 U.S.C. 154(b) by 636 days.

(21) Appl. No.: 12/049,795

(22) Filed: Mar. 17, 2008

(65) Prior Publication Data

US 2009/0230774 A1 Sep. 17, 2009

(51) Int. Cl.
*H01H 9/00* (2006.01)

(52) U.S. Cl. ............... 361/160; 307/64; 307/66; 307/68

(58) Field of Classification Search .............. None
See application file for complete search history.

(56) References Cited

U.S. PATENT DOCUMENTS

| 4,528,459 | A | * | 7/1985 | Wiegel | 307/66 |
|---|---|---|---|---|---|
| 5,191,229 | A | * | 3/1993 | Davis et al. | 307/66 |
| 5,646,458 | A | | 7/1997 | Bowyer et al. | |
| 5,703,412 | A | | 12/1997 | Takemoto et al. | |
| 5,744,876 | A | * | 4/1998 | Fangio | 307/66 |
| 5,796,175 | A | | 8/1998 | Itoh et al. | |
| 5,811,947 | A | | 9/1998 | Hurst et al. | |
| 6,255,743 | B1 | * | 7/2001 | Pinkerton et al. | 290/40 C |
| 6,614,134 | B1 | | 9/2003 | Davies | |
| 7,071,581 | B2 | | 7/2006 | Eisenhaure et al. | |
| 7,129,593 | B2 | | 10/2006 | King et al. | |
| 2006/0097577 | A1 | | 5/2006 | Kato et al. | |
| 2009/0230897 | A1 | * | 9/2009 | Coenen | 318/369 |

\* cited by examiner

*Primary Examiner* — Stephen W Jackson
*Assistant Examiner* — Terrence R Willoughby
(74) *Attorney, Agent, or Firm* — Michael Best & Friedrich LLP

(57) ABSTRACT

Methods and systems for supplying auxiliary electrical power to a controller during power loss are described hereinabove. The system is powered by a primary power source, and includes a controller and a winding load that are both powered by the primary power source, and a switching device. When the primary power source is disconnected from the controller and winding load, the winding load continues to residually exercise to generate residual electrical power. The second switching device then channels the residual electrical power to the controller for a period of time at an acceptable level.

17 Claims, 3 Drawing Sheets

EXTENDED CONTROLLER KEEP ALIVE SYSTEM AND METHOD

BACKGROUND

Embodiments of the invention include a system for supplying auxiliary power to a microprocessor or similar circuit during a loss of power.

Power losses occur for a variety of reasons. For example, a power loss can occur when a fuse blows, a battery connection is lost, or a ground fault occurs. During a power loss, microprocessors are generally unable to keep outputs asserted. Microprocessors are subsequently reset resulting in a loss functionality during the reset period that was being executed prior to the power loss. Of course, microprocessor and microprocessor-based controllers are used to control a variety of devices including various machines and vehicles.

Typical solutions to power loss problems in microprocessor-based systems include 1) using multiple surface mount devices ("SMD") such as capacitors and 2) using a single, very large value, through-hole electrolytic capacitor at the voltage supply input. These solutions are generally costly and require a relatively large amount of printed circuit board ("PCB") area. For example, using a single, very large value, through-hole electrolytic capacitor could involve unique manufacturing processes, which increases the cost of manufacturing such circuits. In some cases, a 220 µF capacitor is used and such a capacitor can generally keep power supplied to a microprocessor for approximately 3 ms. To provide power to the microprocessor for an extended amount of time, such as, for example, 20 ms, a capacitor having a size that is approximately ten times that of the 220 µF capacitor is required.

SUMMARY

One purpose of the invention is to maintain a minimum amount of electrical power in the form of voltage and/or current to keep a controller functional during power outage events such as a battery dropout. Such events can occur during standard automotive driving situations and/or during severe driving maneuvers. Many automobile manufacturers require that electronic modules manufactured by component suppliers be designed to provide a solution to such events.

In one embodiment, the invention provides a method of supplying auxiliary power to a controller primarily being powered by a battery or similar local source of power (referred to as a "primary source"). The method includes actuating a winding load (such as turning an electric motor on by activating a switch) that is coupled to the controller. The method also includes configuring the circuit so that when an interruption in the power supplied by the primary source occurs, the winding load is deactivated. The method also includes collecting energy created as a result of residual motion or activity of the winding load (such as the motor's continued movement after power has been interrupted) that occurs after the winding load has been deactivated, and channeling the winding energy from the winding load to the controller.

In another embodiment, the invention provides a control system that includes a primary power source, a controller, a winding load, and a switching device. The primary power source is configured to supply power to the system. The controller is configured to receive power from the primary power source. The winding load is powered by the primary power source and the winding load generates an auxiliary current as a result of residual activity. The switching device channels the auxiliary current to the controller when the power provided by the primary power source to the controller has been disconnected or interrupted.

In another embodiment, the invention provides a method of supplying secondary power to a controller primarily being powered by a primary source. The method includes powering a switching device, and when the switching device has been powered, activating the switching device with power from the primary source. The method also includes actively exercising a winding load with power from the primary source, residually exercising the winding load after the power from the primary source has been disconnected from the winding load to produce a residual current, and channeling the residual current from the winding load to the controller.

Certain embodiments 1) can be retrofitted to existing controller systems with simple circuits, 2) reduce the need for redesigning tooling to produce new control circuits, and 3) reduce the PCB area required. In one particular embodiment of the invention, rather than a series of ten 220 uF SMD capacitors or a single large electrolytic capacitor, a simple switching device such as a diode is used.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Some of the modules and logical structures described are capable of being implemented in software executed by a microprocessor or a similar device or of being implemented in hardware using components such as application specific integrated circuits ("ASICs"). Terms like "processor" may include or refer to both hardware and/or software. In addition, throughout the specification capitalized terms are used. Such terms are used to conform to common practices and to help correlate the description with the drawings. However, no specific meaning is implied or should be inferred simply due to the use of capitalization.

Embodiments of the invention provide a method and a system of supplying electrical power in the form of current and/or voltage to a controller during power loss. In one particular form, a primary power source powers the system that includes a controller and a winding load, and a switching device. When the primary power source is disconnected from the controller and winding load, respectively, the winding load continues to residually exercise to generate electrical power. The switching device then channels the residual electrical power to the controller for a period of time at an acceptable level.

Figure 1:
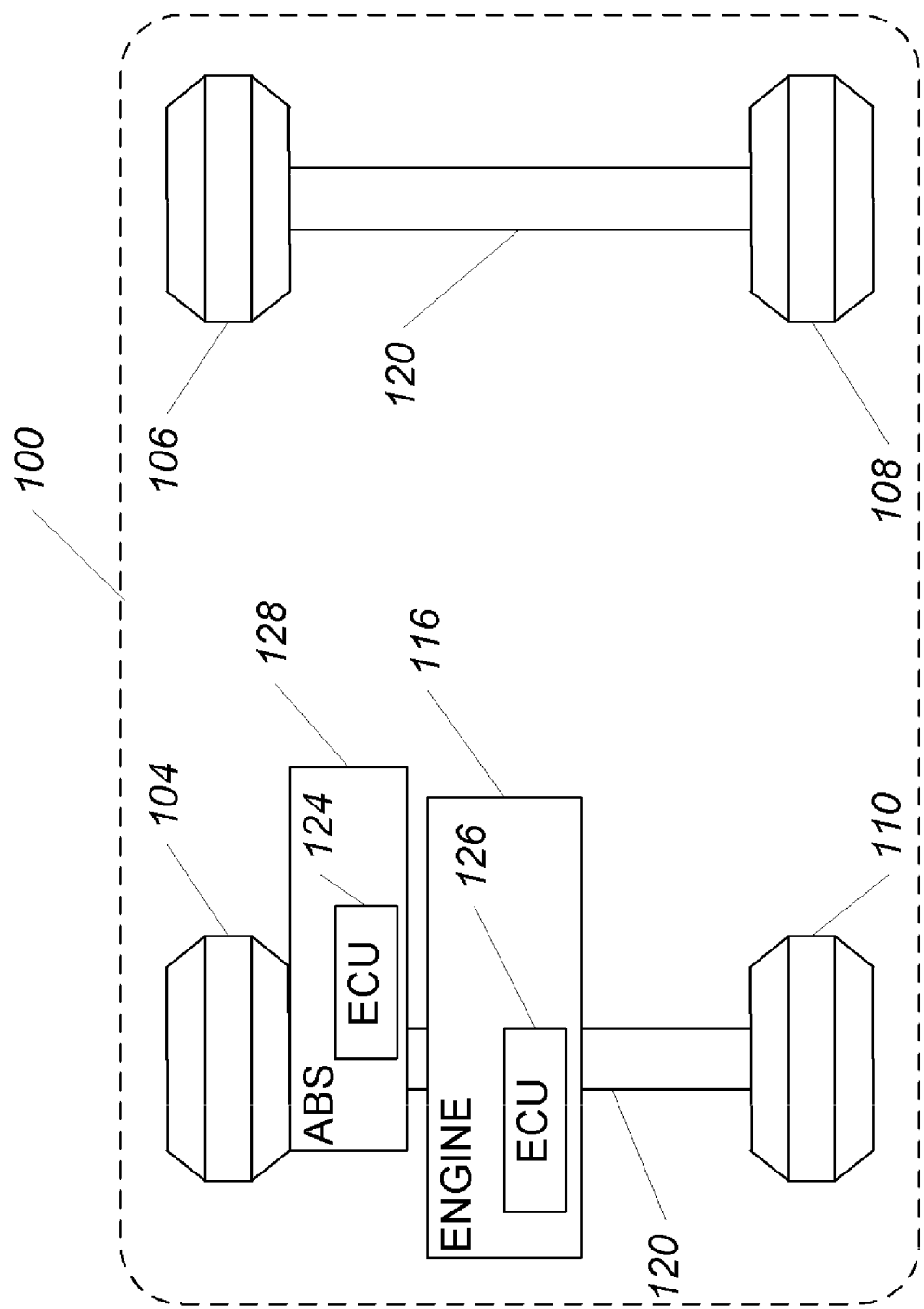
FIG. 1 shows a schematic plan view of an exemplary vehicle.

FIG. 1 shows a schematic plan view of an exemplary vehicle 100. The vehicle 100 has four wheels 104, 106, 108, and 110. An engine 116 and associated axles 120, with the driven wheels being 104, and 110. The vehicle 100 also includes a plurality of electronic control units ("ECU's") 124 and 126 that respectively control a plurality of vehicle subsystems such as an antilock brake system 128 and the engine 116. Other exemplary vehicle subsystems include, but are not limited to, transmission systems; safety systems; power-lock and -window systems; heating, ventilation, and air-conditioning ("HVAC") systems, and the like. In some embodiments, an ECU of a transmission exchanges information with the ECU 126 of the engine 116. For example, the ECU of the transmission can send information to the ECU 126 of the engine 116 that the transmission is in a particular gear. The ECU 126 of the engine 116 then determines an optimal amount of fuel to use based on the provided information.

Figure 2:
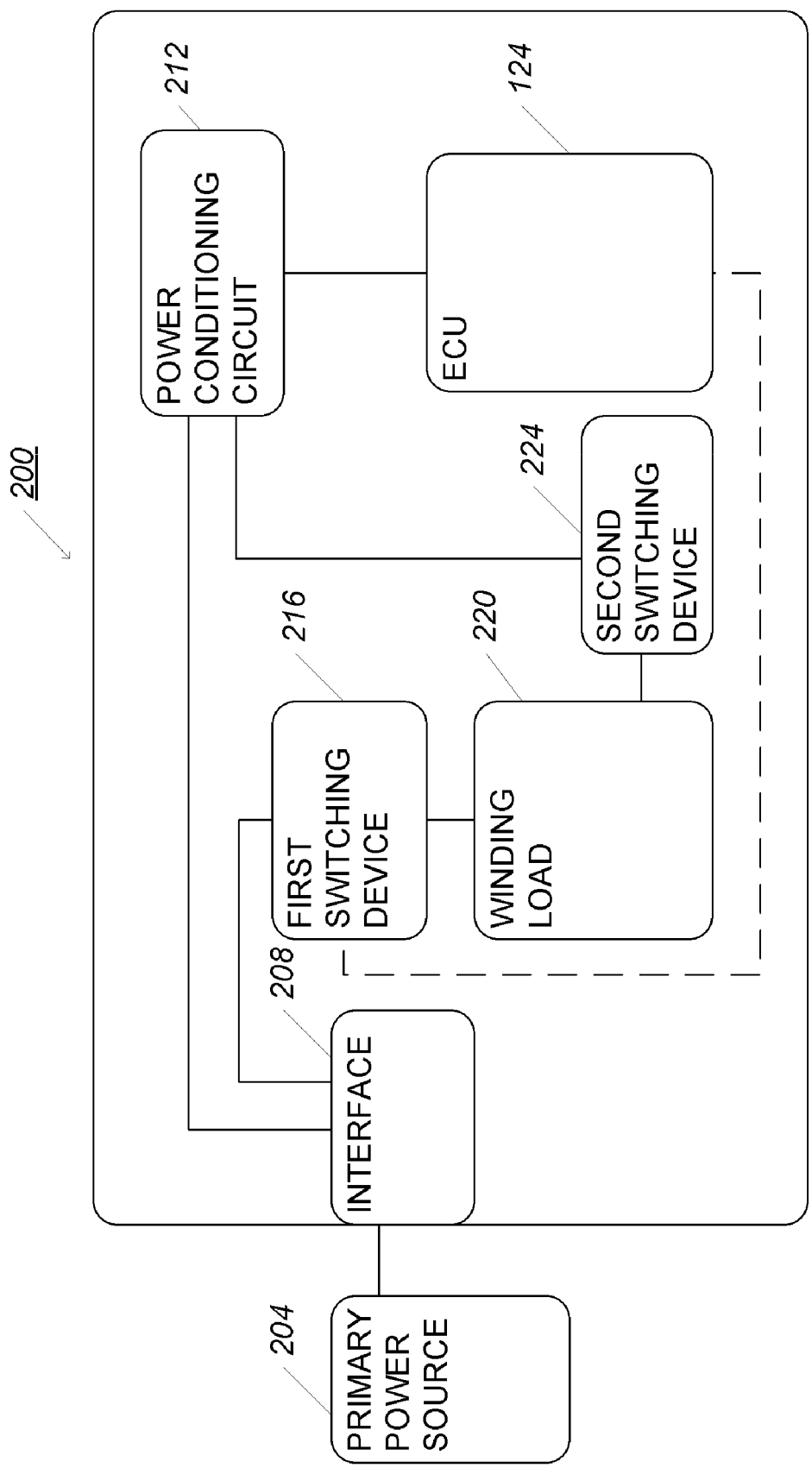
FIG. 2 shows an exemplary block diagram of a vehicle control system.

FIG. 2 shows an exemplary control system 200, such as the antilock brake system 128 of FIG. 1, for use with the vehicle 100 of FIG. 1, wherein like numerals refer to like parts. A primary power source 204, such as a vehicle battery, powers the system 200 through an interface 208. A power conditioning circuit 212 receives power from the primary power source 204 through the interface 208, conditions the power received, and delivers conditioned power to the ECU 124.

A first switching device or switch 216 is connected to the interface 208 and controls delivery of power to a winding load 220. The switch 216 is controlled by the ECU 124, which can activate (e.g., close) or deactivate (e.g., open) the switch 216 by sending a control signal to the switch 216. In the embodiment shown, the switch 216 is a power switch such as a MOSFET. Exemplary winding loads include motors, inductors, solenoids, and the like. The winding load 220 receives power from the primary source 204 through the switch 216 which is activated or energized (alternatively referred to as "actively exercised"). For example, when the winding load 220 is a motor, the current supplied to the motor causes an armature to rotate or spin.

When the primary power source 204 is disconnected from the system 200 or power from the source 204 is interrupted, power to the winding load 220 is similarly disconnected or interrupted. This may occur for a number of reasons. First both the winding load 220 and ECU 124 are coupled at least indirectly to the source 204. Any failure in the source 204 itself, will result in the interruption of power to devices coupled to the source. In addition, any interruption that impacts the ECU 124 may impact the ECU's ability to control the switch 216 which, in turn, could impact the supply of power to the winding load 220. When power to the winding load 220 is interrupted, the winding load 220 still contains residual energy. When the winding load 220 is or includes a motor and the motor is deactivated it will nonetheless have residual energy and begins to "residually exercise" or continue to rotate or spin in a descending rate, or slow down. When the winding load 220 residually exercises, the winding load 220 acts as a generator. While acting as a generator, the winding load 220 converts its rotational movement (and energy) into auxiliary electrical power in the form of current and voltage. The auxiliary power is generated substantially instantaneously. The winding load 220 can also be a solenoid or an inductor that stores or collects energy when exercised or actuated. When auxiliary power is disconnected as discussed, energy stored in the winding load is converted into electrical power in the form of current and voltage.

Once the winding load 220 residually exercises to generate auxiliary electrical power, the system 200 channels the auxiliary electrical power to the ECU 124 through a second switching device 224 and the conditioning circuit 212. In this way, the ECU 124 can be powered with the winding load 220 for a period of time when the primary power source 204 or power provided by the primary power source 204 has been disconnected to the subsystem 200. Exemplary second switching devices 224 include diodes, transistors, relays, and the like.

Figure 3:
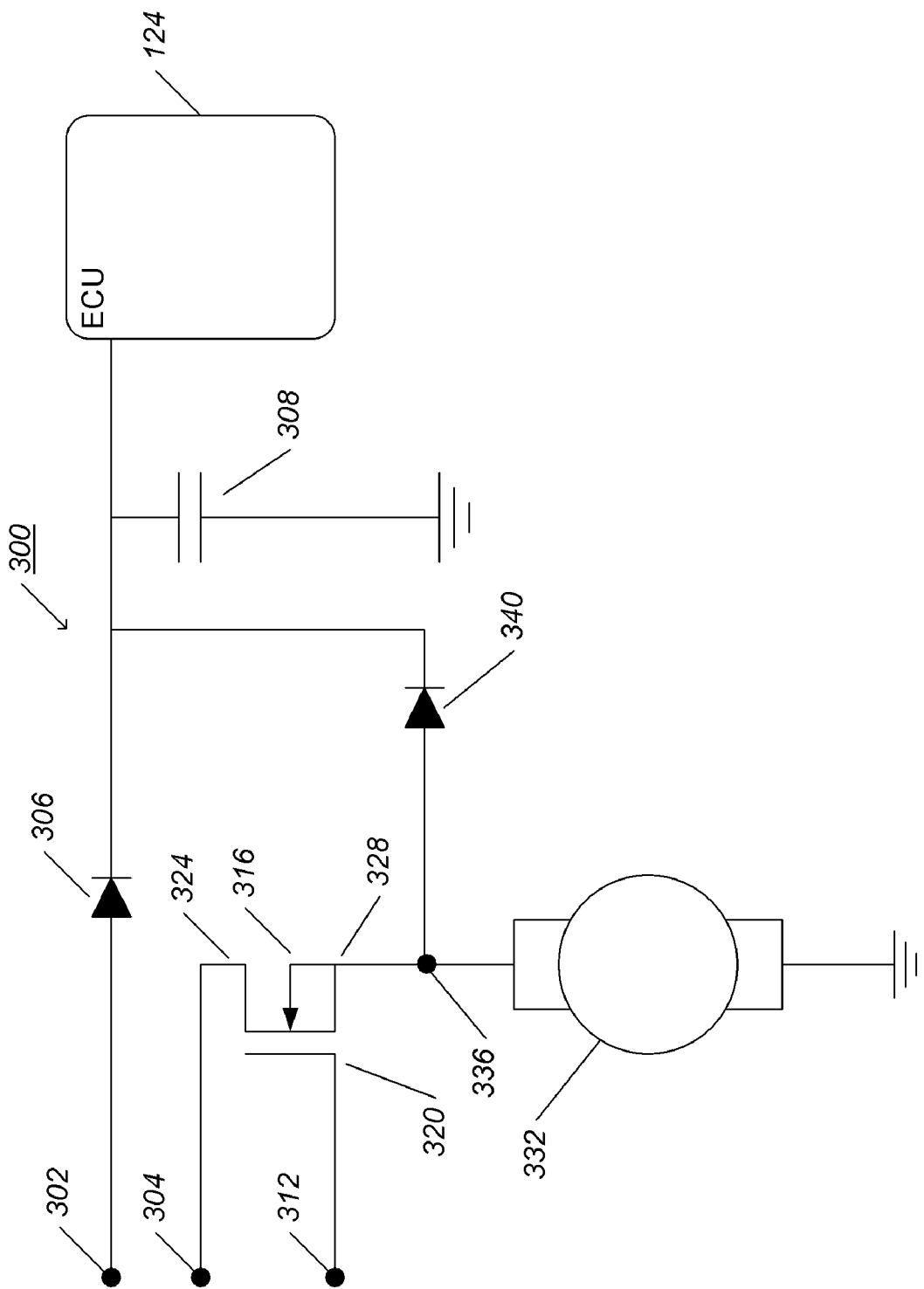
FIG. 3 shows an exemplary schematic of an extended keep-alive circuit for use with the vehicle of FIG. 1.

FIG. 3 shows an exemplary schematic of an extended keep-alive circuit 300 for use with the vehicle 100 of FIG. 1, wherein like numerals refer to like parts. Nodes 302 and 304 receive power from the primary power source 204 of FIG. 2 through the interface 208. In some embodiments, nodes 302 and 304 can be coupled to different sources of power, but in most embodiments the nodes 302 and 304 are connected to the same source. A diode 306 channels the electrical power to the ECU 124 conditioned by a capacitor 308 (212 of FIG. 2) and prevents the energy flowing back to node 302 during power loss. More extensive conditioning circuits may be required to prevent damage of electrical components due to excessive residual voltage from large motors.

Node 312 receives an activation signal from the ECU 124. In the embodiment shown, a transistor 316 controls delivery of power to a motor (discussed below). The transistor 316 can be power transistor such as an n-channel MOSFET configured to handle relatively high currents, such currents of ten amps or more. The transistor 316 has a gate 320, a drain 324, and a source 328 and receives the activation signal from the ECU 124 at the gate 320. The drain 324 receives power having a voltage from the primary power source 204, and the source 328 is connected to a pump motor 332 (220 of FIG. 2) which exercises or spins when powered.

In the embodiment shown in FIG. 3, the transistor 316 has three operating states. For example, the power transistor 316 is in an OFF or deactivated state when the voltage at the gate 320 (or node 312) is less than the voltage at the source 328 by an amount of, for example, 2 v. This amount will vary depending on the type of transistor chosen. In the OFF state, the internal resistance of the transistor 316 from the drain 324 to the source 328 is generally considered to be relatively high. As a consequence, very little or substantially no current flows through the transistor 316. Thus, the motor 332 is not actuated.

The transistor 316 is in an ON or activated state when the voltage at the gate 320 (or node 312) is greater than the voltage at the source 328 at least by another amount, such as, for example 5 v, depending on the type of transistor chosen. In such cases, the internal resistance of the transistor 316 from the drain 324 to the source 328 is considered relatively low. Current thus flows through the transistor 316, and causes the motor 332 to operate. When the motor 332 is actuated, it generates a voltage, $V_s$, at node 336.

In some embodiments, the motor 332 can be modeled as an inductor, a resistor, and a speed dependent voltage source or generator. The motor 332 can generally be modeled as an inductor because windings of the motor 332 generate magnetic flux, similar to that of an inductor. When the motor 332 is powered, it inductively stores energy. The stored energy flows back to associated circuits when current supplied to the motor 332 is interrupted. However, flowing energy back to associated circuits is generally considered a non-ideal characteristic of the motor 332.

Alternatively, the motor 332 can generally be modeled as a resistor having an internal resistance because the motor 332 has a non-zero resistance due to the windings and brushes of the motor 332. When the motor 332 is inactive, the internal resistance from the drain 324 to the source 328 determines an amount of current flowing through the motor 332.

The motor 332 can also be modeled as a generator because spinning coils of the motor 332 generate a voltage based on how fast the motor 332 is spinning (i.e., the motor's speed). For example, suppose the motor 332 can spin at a maximum speed of 5000 revolutions per minute ("rpm") at no load, and operates at a supply voltage of 12 v (at node 304) with 20 A of current drawn. In such a case, the voltage drop across the internal resistance (about 100 mΩ) is about 2 v (20 A×100 mΩ). If the voltage generated by the generator is 0.002 v per rpm, the voltage generated, $V_s$, at node 336, is 10 v.

Continuing the example, the motor 332 can spin at a maximum speed of 2500 rpm with a medium load (with a supply voltage of 12 v and 20 A of current drawn). Under such conditions, the voltage generated by the motor 332 is about 5 v (0.002 v per rpm×2500 rpm). The voltage drop across the internal resistance from the drain 324 to the source 328 is, therefore, 7 v (12 v−5 v). As a result, current generated by the motor 332 is 70 A (7 v/100 mΩ). When power supplied to the motor 332 at node 304 is disconnected, rotational inertia of the motor 332 keeps the motor 332 spinning or rotating for a period of time. In the above-identified example with no load, the motor 332 continues, for a moment, to generate a voltage of 10 v at node 336.

The transistor 316 is in a transitional state when the transistor 316 transitions from the ON state to the OFF state, which occurs, for example, when power is disconnected from the circuit 300 at nodes 302 and 304. Once in the OFF state (which occurs relatively quickly), the transistor 316 is deactivated. As a result, current stops flowing through the transistor 316, and the motor 332 enters a residual exercising state. Particularly, the motor 332 continues to generate the same amount of voltage, $V_s$, at node 336 when the motor 332 begins to residually exercise, and acts as a generator. The amount of voltage, $V_s$, at node 336 generally remains the same for a period of time, particularly because the motor 332 substantially exercises at the same rate as just before power delivered to the motor 332 is disconnected. A diode 340 (224 of FIG. 2) then channels an amount of current corresponding to the power generated residually at the motor 332 to the ECU 124 conditioned by the capacitor 308 for a period of time. In some embodiments, the circuit 300 supplies the amount of current to the ECU 124 from about 120 ms to about 184 ms.

Various features and advantages of the invention are set forth in the following claims.

What is claimed is:

1. A method of supplying auxiliary power to a microprocessor-based controller powered by a primary source, the method comprising:
   actuating a winding load coupled to the controller;
   deactivating the winding load after the primary source has stopped providing power to the winding load and a processor included in the controller;
   collecting winding energy while the winding load residually exercises after the winding load has been deactivated;
   channeling the winding energy from the winding load to the controller, wherein channeling the winding energy includes channeling a current to the controller; and
   channeling the current to the controller through a switching device.

2. The method of claim 1, wherein the switching device comprises at least one of a diode, a transistor, and a relay.

3. The method of claim 1, wherein actuating the winding load comprises activating a second switching device.

4. The method of claim 3, wherein deactivating the winding load comprises deactivating the second switching device.

5. The method of claim 4, wherein at least one of the first switching device and the second switching device comprises of a transistor powered by the primary source.

6. The method of claim 1, wherein the winding load can comprise of a motor, a solenoid or an inductor.

7. A control system comprising:
   a primary power source configured to supply power;
   a controller configured to receive primary power from the primary power source;
   a winding load configured to be powered by the primary power source, to exercise while being powered by the primary power, to residually exercise when power supplied by the primary power source is disconnected, and to generate auxiliary current while residually exercising; and a switching device configured to channel the auxiliary current to the controller when the power provided by the primary power source to the controller has been disconnected.

8. The control system of claim 7, further comprising a power switch configured to receive power from the primary power source, to be activated with the received power, and to actuate the winding load when activated.

9. The control system of claim 8, wherein the switch comprises a transistor powered by the primary source.

10. The control system of claim 7, wherein the winding load comprises a motor, a solenoid, or an inductor.

11. The control system of claim 7, wherein the switching device comprises at least one of a diode, a transistor, and a relay.

12. A method of supplying secondary power to a controller primarily being powered by a primary source, the method comprising:
    powering a first switching device;
    when the first switching device has been powered, activating the first switching device with power from the primary source;
    actively exercising a winding load with power from the primary source;
    residually exercising the winding load after the power from the primary source has been disconnected from the winding load and the controller, the winding load thereby producing a residual current; and
    channeling the residual current from the winding load to the controller, wherein channeling the residual current comprises passing the current to the controller through a second switching device.

13. The method of claim 12, further comprising collecting residual energy while residually exercising the winding load.

14. The method of claim 13, further comprising converting the residual energy into the residual current.

15. The method of claim 12, wherein the winding load comprises a motor, a solenoid, or an inductor.

16. The method of claim 12, wherein the switching device comprises a transistor powered by the primary source.

17. The method of claim 12, wherein the second switching device comprises at least one of a diode, a transistor, and a relay.

* * * * *